United States Patent
van Roermund et al.

(10) Patent No.: US 9,800,554 B2
(45) Date of Patent: Oct. 24, 2017

(54) METHOD FOR ESTABLISHING SECURE COMMUNICATION BETWEEN NODES IN A NETWORK, NETWORK NODE, KEY MANAGER, INSTALLATION DEVICE AND COMPUTER PROGRAM PRODUCT

(71) Applicant: NXP B.V., Eindhoven (NL)

(72) Inventors: Timo van Roermund, Eindhoven (NL); Ewout Brandsma, Eindhoven (NL); Maarten Christiaan Pennings, Waalre (NL)

(73) Assignee: NXP B.V., Eindhoven (NL)

( * ) Notice: Subject to any disclaimer, the term of this patent is extended or adjusted under 35 U.S.C. 154(b) by 24 days.

(21) Appl. No.: 13/866,822

(22) Filed: Apr. 19, 2013

(65) Prior Publication Data
US 2013/0312072 A1   Nov. 21, 2013

(30) Foreign Application Priority Data
May 15, 2012   (EP) .................................... 12168079

(51) Int. Cl.
*H04L 29/06* (2006.01)

(52) U.S. Cl.
CPC .......... *H04L 63/04* (2013.01); *H04L 63/0492* (2013.01); *H04L 63/065* (2013.01)

(58) Field of Classification Search
CPC .... H04L 63/065; H04L 63/04; H04L 63/0492
See application file for complete search history.

(56) References Cited

U.S. PATENT DOCUMENTS

| 7,912,224 B2 | 3/2011 | Lee et al. |
| 2004/0098581 A1 | 5/2004 | Balfanz et al. |

(Continued)

FOREIGN PATENT DOCUMENTS

| CN | 1977513 A | 6/2007 |
| CN | 102447679 A | 5/2012 |

(Continued)

OTHER PUBLICATIONS

M'Raihi, et.al., HOTP: An HMAC-Based One-Time Password Algorithm, IETF [online] Dec. 2005, [Retrieved on Oct. 30, 3014], Retrieved from the Internet< http://tools.ietf.org/html/rfc4226>.*

(Continued)

*Primary Examiner* — Matthew Smithers

(57) ABSTRACT

According to an aspect of the invention, a method for establishing secure communication between nodes in a network is conceived, wherein the network comprises a key manager which accommodates a key-manager-specific public key and a corresponding key-manager-specific private key; wherein a copy of the key-manager-specific public key is stored in an installation device; wherein the installation device provides a new node with the copy of the key-manager-specific public key; and wherein said new node is registered with the key manager by providing a node-specific public key and an identifier of said new node to the key manager, such that other nodes in the network may setup end-to-end secure connections with said new node by requesting the node-specific public key of said new node from the key manager.

20 Claims, 4 Drawing Sheets

(56) References Cited

U.S. PATENT DOCUMENTS

| | | | |
|---|---|---|---|
| 2005/0246770 A1* | 11/2005 | Hunt | H04L 9/3273 726/17 |
| 2006/0032901 A1* | 2/2006 | Sugiyama | G07C 9/00103 235/375 |
| 2006/0150241 A1* | 7/2006 | Huh | H04L 9/32 726/4 |
| 2007/0054616 A1 | 3/2007 | Culbert | |
| 2008/0204248 A1 | 8/2008 | Cam Winget et al. | |
| 2008/0267195 A1* | 10/2008 | Belmon | H04L 12/46 370/401 |
| 2009/0063851 A1 | 3/2009 | Nijdam | |
| 2010/0161982 A1* | 6/2010 | Oh | H04L 9/083 713/168 |
| 2011/0116631 A1 | 5/2011 | Shon et al. | |
| 2011/0283104 A1* | 11/2011 | Sangubhatla | H04L 63/0823 713/168 |
| 2011/0291803 A1* | 12/2011 | Bajic | G08B 13/2462 340/10.1 |
| 2012/0204032 A1* | 8/2012 | Wilkins | H04L 9/006 713/170 |
| 2013/0076491 A1* | 3/2013 | Brandsma | H04W 52/0229 340/10.3 |
| 2013/0141223 A1 | 6/2013 | Brandsma et al. | |
| 2013/0198813 A1 | 8/2013 | Roermund et al. | |
| 2013/0211761 A1 | 8/2013 | Brandsma et al. | |
| 2013/0271268 A1 | 10/2013 | Brandsma et al. | |
| 2013/0312072 A1 | 11/2013 | Roermund et al. | |
| 2014/0068089 A1 | 3/2014 | Brandsma et al. | |

FOREIGN PATENT DOCUMENTS

| | | |
|---|---|---|
| EP | 1 335 563 A2 | 8/2003 |
| EP | 1 395 019 A2 | 3/2004 |
| EP | 1 993 301 B1 | 11/2008 |
| WO | 2009/048467 | 4/2009 |

OTHER PUBLICATIONS

M'Raihi, et.al., TOTP: Time-Based One-Time Password Algorithm, IETF [online], May 2011, [Retrieved on Oct. 30, 2014], Retrieved from the Internet< http://tools.ietf.org/html/rfc6238>.*

PGP, PGP Global Directory Frequently Asked Questions (FAQ), PGP Corp. [online] copyright 1991-2008, [Retrieved on Oct. 30, 2014]. Retrieved from the Internet< http://keyserver.pgp.com/vkd/VKDHelpPGPCom.htm>.*

Klein, Designing Bulk Encoding Applications Using UHF RFID Technology, Datasheet [online], Digi-Key Corp. copyright 2011, [retrieved on Oct. 30, 2014], Retrieved from the Internet: < http://www.digikey.com/Web%20Export/Supplier%20Content/thing-magic-1523/pdf/thingmagic-designing-bulk-encoding-applications.pdf?redirected=1>.*

M'Raihi, et.al., HOTP: An HMAC-Based One-Time Password Algorithm, IETF [online] Dec. 2005, [Retrieved on Oct. 30, 2014], Retrieved from the Internet< http://tools.ietf.org/html/rfc4226>.*

TOTP: Time-Based One-Time Password Algorithm, IETF [online], May 2011, [Retrieved on Oct. 30, 2014], Retrieved from the Internet< http://tools.ietf.org/html/rfc6238>.*

PGP Global Directory Frequently Asked Questions (FAQ), PGP Corp. [online] copyright 1991-2008, [Retrieved on Oct. 30, 2014]. Retrieved from the Internet< http://keyserver.pgp.com/vkd/VKDHelpPGPCom.htm>, hereafter referred to as PGP.*

Extended European Search Report for Patent Appln. No. 12168079.7 (Oct. 10, 2012).

Non-Final Office Action for U.S. Appl. No. 13/754,729 dated Sep. 15, 2015.

Chinese Office Action for CN Application No. 201310176332.0 dated Nov. 26, 2015.

* cited by examiner

METHOD FOR ESTABLISHING SECURE COMMUNICATION BETWEEN NODES IN A NETWORK, NETWORK NODE, KEY MANAGER, INSTALLATION DEVICE AND COMPUTER PROGRAM PRODUCT

CROSS-REFERENCE TO RELATED APPLICATIONS

This application claims the priority under 35 U.S.C. §119 of European patent application no. 12168079.7, filed on May 15, 2012, the contents of which are incorporated by reference herein.

FIELD OF THE INVENTION

The invention relates to a method for establishing secure communication between nodes in a network. The invention also relates to a corresponding network node, key manager, installation device and computer program product.

BACKGROUND OF THE INVENTION

In recent years, large networks such as smart building networks have gained importance. These networks typically consist of a large number of network nodes. In general, it is not difficult to intercept messages in a network. In wired networks, this could be done by tapping onto the wires by someone who has physical access to the network cables. In wireless networks it is even simpler, since anyone who is within range of the network can receive all messages that are sent around. So even someone outside a building can typically receive the messages sent by devices within this building.

Therefore, many networks use network encryption, such that the content of the intercepted messages cannot easily be interpreted. For example, many Wi-Fi networks are configured to use WEP or WPA encryption with pre-shared (symmetric) keys. In such a network, all messages that are sent around are encrypted using the network key. An adversary who does not have knowledge of the network key can still receive the messages, but he is not able to interpret them since they are enciphered. However, any node that has knowledge of the network key—i.e. any node that is joined into the network—can decipher such a message, whether or not this node was the intended recipient of the message. Furthermore, the probability that the shared symmetric network key is compromised (i.e. is leaked) is not negligible, since there are many places (i.e. nodes) where this key could leak. If that would happen, even an adversary who has a node which is not joined in the network but does have the network key, could intercept and decipher all messages. For some applications—most notably applications where money is involved—it is therefore very undesirable to solely rely on the network encryption.

Node-to-node (i.e. end-to-end) security—where messages are sent encrypted along a channel and only the recipient (and potentially the sender) has the key to decipher the message—can be a solution to this problem. Two common techniques that are used to achieve end-to-end encryption are symmetric and public-key cryptography.

When symmetric cryptography is used, each node has a symmetric (secret) key for every other node with which it needs to setup a secure connection. A disadvantage of using symmetric crypto for node-to-node security is that key management is difficult. First of all, each node needs to have a unique key for secure communication with every other node, which means that the total number of keys in the network will be large—assuming that any two nodes should be able to setup a secure node-to-node connection with a unique key for that connection. In a network containing n nodes, there are $$\binom{n}{2} = \frac{n!}{2!(n-2)!} = \frac{1}{2}n(n-1)$$

possible node-to-node connections. For a network of 25 nodes, the number of node-to-node keys is 300 and for a network containing 1000 nodes, the number of keys is close to 500,000. Another reason why key management and distribution for symmetric keys is difficult is that the keys should always remain secret to adversaries, which complicates their distribution.

When public-key cryptography is used instead, each node simply publishes a public (non-secret) key. Any other node can use this key to send encrypted messages to the node who has published the public key, since only that node knows the corresponding private key that is needed to decrypt the message. So, using public-key cryptography for node-to-node encryption has two main advantages:

first, the number of keys is limited—in a network consisting of n nodes, there are only n keys—and secondly, the key distribution can be done in the plain—i.e. over an unsecure channel—because only the public (non-secret) keys need to be exchanged.

Although key distribution is a lot easier when public-key cryptography is used for node-to-node encryption, it is still not an obvious task: somehow, the recipients of these keys must also be able to trust that the public key really belongs a certain (legit) node and not to an unauthorized adversary. For example, assume that a certain node—node A—wants to send a secret message to another node—node B. If an adversary has published his own public key together with the identity, for example the Media Access Control (MAC) address, of node B, the adversary will be able to decrypt the messages sent by node A. And worse, the intended recipient—node B—will not be able to decrypt the messages. Therefore, the sending node—node A—needs to know whether the public key of node B is authentic, i.e. whether it really belongs to node B.

In existing solutions, a Public Key Infrastructure (PKI) is typically used. In such a PM, public keys are bound to respective user identities by means of certificates which are issued by certificate authorities (CAs). The CA at the top of the trust chain is called the root CA. In order to add a new node to the PKI, the following two provisioning steps must be performed: first, the new node must be registered with a certificate authority, which checks the node for (amongst others) authenticity and, if the checks are passed, binds the node's identity (e.g. MAC address) to the node's public key via a certificate (signed by the CA). Secondly, the root CA's public key must be supplied to the new node, such that the node itself can verify the certificates (containing the identity and public keys) of other nodes and CAs, in order to verify the authenticity of these certificates. The process of provisioning new nodes within a PM is in general a difficult process. In particular, the process of installing and registering new nodes is not intuitive.

In view thereof, there is a need to simplify the establishment of secure communication between network nodes of the kind set forth. In particular, there is a need to simplify the process of provisioning new nodes in a network while maintaining a high level of security. More specifically, there is a need to simplify the process of installing and registering new nodes while maintaining a high level of security.

SUMMARY OF THE INVENTION

It is an object of the invention to simplify the process of provisioning new nodes in a network while maintaining a high level of security. This object is achieved by a method as defined in claim 1, a network node as defined in claim 12, a key manager as defined in claim 13, an installation device as defined in claim 14, and a computer program product as defined in claim 15.

According to an aspect of the invention, a method for establishing secure communication between nodes in a network is conceived, wherein the network comprises a key manager which accommodates a key-manager-specific public key and a corresponding key-manager-specific private key; wherein a copy of the key-manager-specific public key is stored in an installation device; wherein the installation device provides a new node with the copy of the key-manager-specific public key; and wherein said new node is registered with the key manager by providing a node-specific public key and an identifier of said new node to the key manager, such that other nodes in the network may setup end-to-end secure connections with said new node by requesting the node-specific public key of said new node from the key manager.

The invention enables a relatively easy—yet secure—installation of new nodes in a network. Furthermore, a network node does not need to have memory space for storing a lot of security-related data, except for a public key specific to a node with which it communicates or intends to communicate. The invention enables directing ad-hoc requests for node-specific public keys to a single, dedicated node, i.e. the key manager.

According to an exemplary embodiment of the invention, the installation device provides the copy of the key-manager-specific public key to the new node by writing the copy of the key-manager-specific public key into a R[adio] F[requency] ID[entification] tag connected to said new node.

According to a further exemplary embodiment of the invention, before the installation device provides the copy of the key-manager-specific key to the new node, the copy of the key-manager-specific public key is stored in the installation device via a R[adio] F[requency] ID[entification] connection between the installation device and a R[adio] F[requency] ID[entification] tag connected to the key manager.

According to a further exemplary embodiment of the invention, before the installation device provides the copy of the key-manager-specific key to the new node, the copy of the key-manager-specific public key is stored in the installation device via a secure and authenticated connection between the installation device and the key manager.

According to a further exemplary embodiment of the invention, the installation device further provides the node-specific public key and the identifier of the new node to the key manager by reading the node-specific public key and the identifier of the new node from a R[adio] F[requency] ID[entification] tag connected to said new node and by subsequently writing the node-specific key and the identifier of the new node to a R[adio] F[requency] ID[entification] tag connected to the key manager.

According to a further exemplary embodiment of the invention, the installation device further provides the node-specific public key and the identifier of the new node to the key manager by reading the node-specific public key and the identifier of the new node from a R[adio] F[requency] ID[entification] tag connected to said new node and by subsequently writing the node-specific key and the identifier of the new node to the key manager via a secured wireless connection, in particular a end-to-end secure Wi-Fi connection.

According to a further exemplary embodiment of the invention, the installation device provides the node-specific public key and the identifier of the new node to the key manager as part of a batch registration request for a plurality of new nodes.

According to a further exemplary embodiment of the invention, the key manager generates a registration token for the new node, in particular a registration token which is highly unpredictable and intended for a single use, wherein the registration token is provided to the new node such that the new node may send a registration request comprising the node-specific public key, the identifier of the new node and the registration token to the key manager via the network, and wherein the key manager grants the registration request only if it determines that the registration token is valid.

According to a further exemplary embodiment of the invention, the installation device provides the registration token to the new node by writing the registration token to a R[adio] F[requency] ID[entification] tag connected to said new node.

According to a further exemplary embodiment of the invention, the registration token has a limited lifetime.

According to a further exemplary embodiment of the invention, the following steps are performed in order to setup an end-to-end secure connection between a first registered node and a second registered node: the first registered node requests the public key specific to the second registered node from the key manager; the key manager creates a response comprising at least the public key specific to the second registered node; the key manager signs the response with the key-manager-specific private key and sends the signed response to the first registered node; the first registered node verifies the authenticity of the response using the copy of the key-manager-specific public key; and, if the response is authentic, the first registered node uses the public key specific to the second registered node to setup said end-to-end secure connection.

According to a further aspect of the invention, a network node for use in a method of the kind set forth is conceived.

According to a further aspect of the invention, a key manager for use in a method of the kind set forth is conceived.

According to a further aspect of the invention, an installation device for use in a method of the kind set forth is conceived.

According to a further aspect of the invention, a computer program product is conceived comprising program elements executable by a network node, a key manager or an installation device, wherein each program element comprises program instructions which, when being executed by the network node, key manager or installation device, cause said network node, key manager and installation device to carry out or control respective steps of a method of the kind set forth.

BRIEF DESCRIPTION OF THE DRAWINGS

The invention will be described in more detail with reference to the appended drawings, in which.

DESCRIPTION OF EMBODIMENTS

Figure 1:
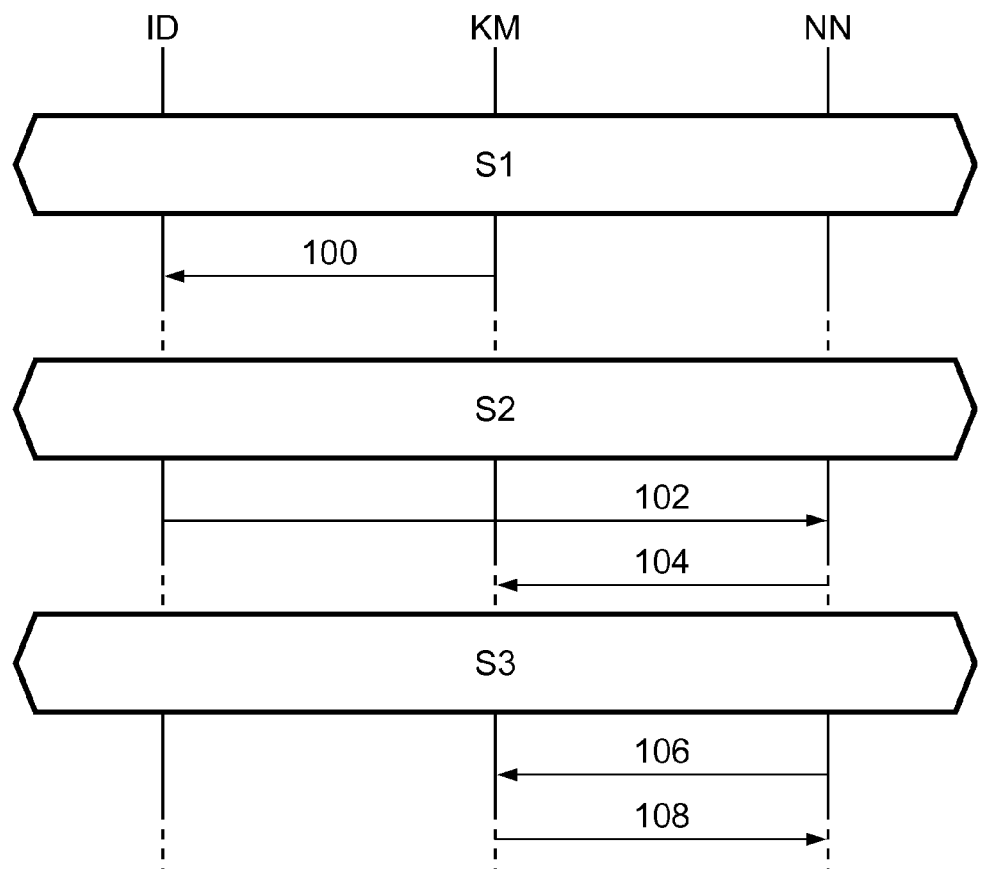
FIG. 1 illustrates an exemplary embodiment of the invention.

FIG. 1 illustrates an exemplary embodiment of the invention. According to this exemplary embodiment, one node in the network acts as the key manager. Network nodes which have been registered with the key manager contain a copy of a key-manager-specific public key. Each new node which joins the network is registered with the key manager. Furthermore, the key manager maintains a list of registered nodes and their (node-specific) public keys. Any node can request the public key of any other node from the key manager. Such a request will be responded to by a reply which is signed by the key manager, such that the receiving node can verify the authenticity of the message using its copy of the key-manager-specific public key. The node can subsequently send private messages to any node of which it has obtained the public key. An installation device is used to provide a copy of the key-manager-specific public key to the new node. Advantageously, this may be the same device that is used to join the new node into the network.

Thus, according to an aspect of the invention a method is conceived for establishing secure communication between nodes in a network. A corresponding system comprises said nodes, as well as the key manager and the installation device. The network comprises a key manager which accommodates a key-manager-specific public key and a corresponding key-manager-specific private key. A copy of the key-manager-specific public key is stored in an installation device. The installation device is arranged to provide a new node which joins the network with the copy of the key-manager-specific public key. The key manager is arranged to receive a node-specific public key and an identifier of said new node. Thereby, the new node is registered with the key manager. Subsequently, other nodes in the network may setup end-to-end secure connections with said new node by requesting the node-specific public key of said new node from the key manager.

The key manager could for example be the main router (or coordinator) in the network. It is further assumed that each node has a (public) identifier (NID), which uniquely identifies the node in the network. For example, this could be the node's Media Access Control (MAC) address. Finally, we assume that each node has (or is able to create) a pair of cryptographic keys, consisting of a public (i.e. non-secret) encryption key and a private (i.e. secret) decryption key.

The key manager (represented by its public key) is the trust anchor for the key distribution system. In the steps "setup installation device" S1 and "add new node" S2 of an exemplary method for establishing secure communication between nodes, the key-manager-specific public key is securely distributed to a new node NN via an authorized installation device ID and short-range communication channels. In the remainder of the step "add new node" S2, the node-specific public key—necessary for ensuring node-to-node link security—is registered with the key manager KM, which keeps a list of all trusted (i.e. registered) nodes and their public keys. Finally, any node can request the public key of any other registered node from the key manager KM by performing the step "start secure node-to-node communication" S3. The requesting node can verify the authenticity of the response of the key manager KM, because the key manager KM signs the response with its private key and the requesting node has a copy of the key-manager-specific public key.

Step "Setup Installation Device"

In the step "setup installation device" S1, the installation device ID gets knowledge of the public key of the key manager KM (i.e. the key-manager-specific public key). In other words, the public key of the key manager KM is sent 100 to the installation device ID. This step can be performed in a number of ways.

For example, assume that the key manager KM is physically inaccessible to unauthorized people, e.g. it is placed in a locked room and only authorized persons have access to the key. In such a scenario, the key manager's public key could be stored in an RFID tag that is physically connected to the key manager KM. An authorized network administrator—who has physical access to the key manager KM—could setup new installation devices by allowing those devices to read the key manager's public key from this RFID tag. This reading is only possible when the installation device ID is in close proximity (i.e. a few centimeters) of the RFID tag. Such an implementation is preferred, since the touch action between the installation device ID and the node is very intuitive. It also puts no further requirements on the installation device ID. For example, the installation device ID may be a simple UI-less "NFC-wand".

Alternatively, a secure and authenticated connection can be set up between the installation device ID and the key manager KM, for example over the Wi-Fi network. The secure and authenticated connection may be a Transport Layer Security (TLS) connection, for example. Furthermore, different procedures can be imagined for providing the installation device ID with the key manager's public key, e.g. when it cannot be prevented that unauthorized persons can come in close proximity of the key manager KM.

Step "Add New Node"

This step takes place after a new node joins the network: the public key of the key manager KM is written by means of a separate write operation into an RFID tag connected to the new node NN, for example. Alternatively, this step can be combined with network joining: the public key of the key manager KM can be part of the network join information—which may furthermore consist of the network frequency, network identifier, etc.—that is written into the connected RFID tag. It is noted that the term "connected RFID tag" refers to an RFID tag which has a wired connection to its host device, so, in this case, to (a controller unit of) the new node NN.

Subsequently, the node identifier (NID) and its public key are sent to the key manager KM in a secure way, thereby registering the new node's public key with the key manager KM. Secure here means that the key manager KM can trust that the public key really belongs to the node identified by the NID, i.e. that it can trust the authenticity of the node's registration request. If this information would simply be sent in-band (i.e. via the network) to the key manager KM without further measures, any adversary could spoof this registration request, thereby for example registering the new node's NID with the adversary's public key. Consequently, the adversary would be able to decipher all messages sent to the new node NN. Therefore, additional measures are required to make this registration process trustworthy. Hereinafter, three different simple and intuitive (yet secure)

procedures are described for registering the new node's public key with the key manager KM.

Figure 2:
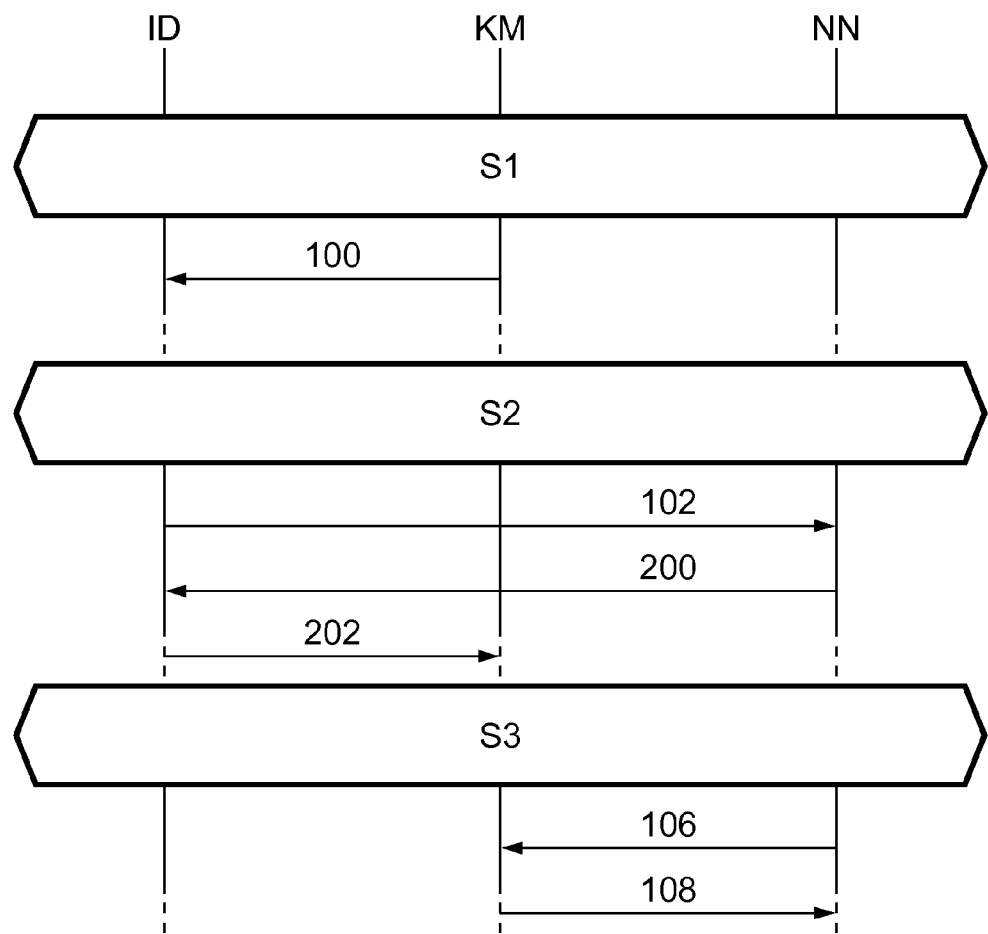
FIG. 2 illustrates a further exemplary embodiment of the invention.

FIG. 2 illustrates a further exemplary embodiment of the invention. In particular, it illustrates a first procedure for registering the new node's public key with the key manager KM.

In this case, the installation device ID acts as an intermediary. After it has written 102 the key manager's public key into the connected RFID tag of the new node NN, it reads 200 the new node's NID and public key from the same tag. Afterwards, the installation device ID is brought in close proximity of the key manager KM and it writes the new node's NID and public key into the key manager's connected RFID tag as part of a registration request 202. This is secure, because the installation device ID needs to be brought in close proximity of the key manager KM and it is assumed that only authorized persons can do so. Therefore, unauthorized persons cannot register new nodes.

An advantage of this procedure is that the implementation can be very intuitive, because it is as simple as tapping the installation device ID to the new node NN and the key manager KM successively. And the installation device ID can still be a simple UI-less "NFC-wand", for example.

A potential disadvantage, however, is that the installation device ID has to be tapped to the key manager KM—to register a new node NN—many times, once for each new node. When many new nodes must be registered, this might be inconvenient. An alternative procedure is that the installation device ID first collects the NIDs and public keys of all new nodes, such that the network administrator—who has physical access to the key manager KM—only needs to tap the installation device ID to the key manager KM once, allowing it to write all registration requests into the key manager's connected tag simultaneously, i.e. in a single batch. A relatively small disadvantage of such a batch registration request is that it takes a bit more time before node-to-node security can be achieved with the new nodes, because the actual registration step is somewhat delayed. However, the user convenience is improved.

Figure 3:
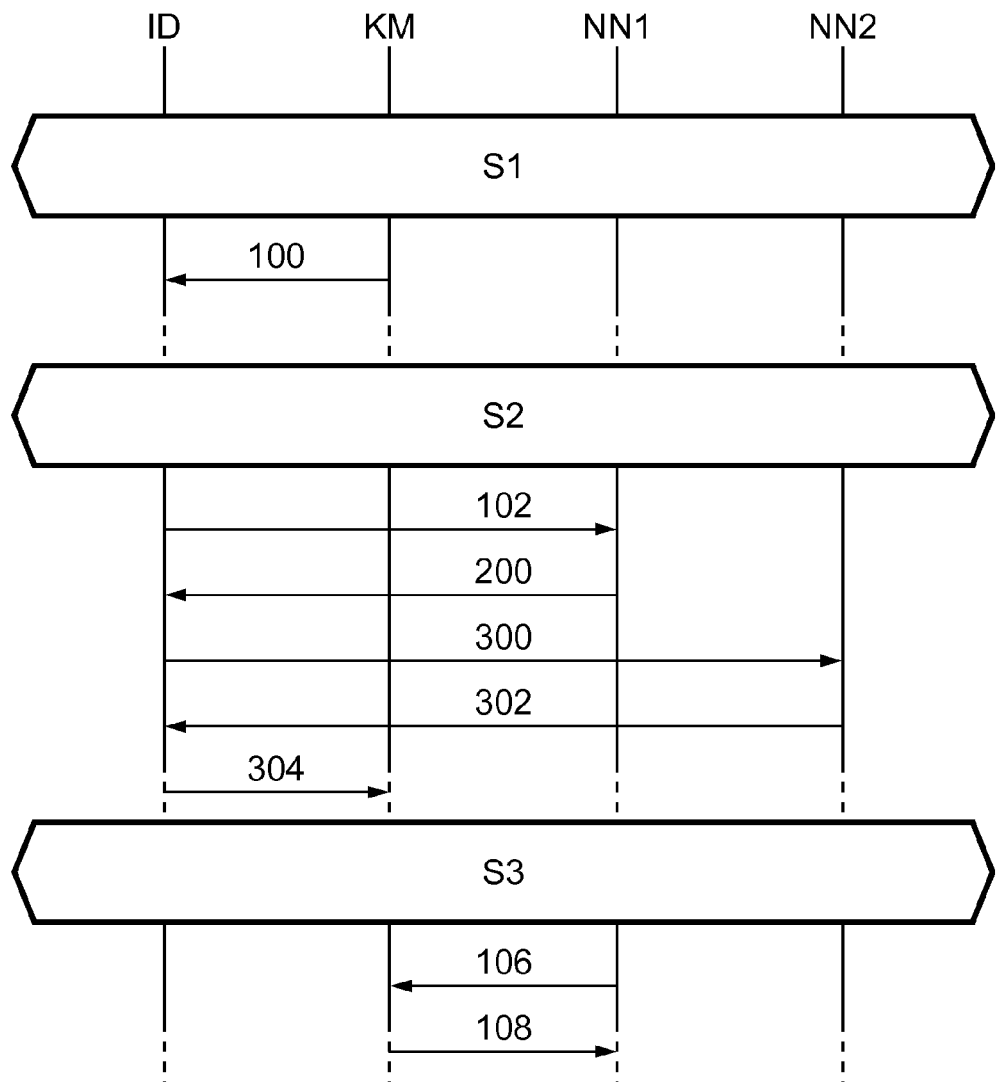
FIG. 3 illustrates a further exemplary embodiment of the invention.

FIG. 3 shows the exchange of information for this alternative procedure. Basically, the exchange of information is the same as in FIG. 2, except that the registration request 202 is replaced by a batch registration request 304 which also comprises the NID and public key of a further node NN2. Before this batch registration request 304 is sent to the key manager KM, the installation device ID provides 300 the key manager's public key to the further new node NN2 and retrieves 302 the further new node's NID and public key from said further new node NN2, in order to include those data in the batch registration request 304.

In another alternative procedure (not shown) the installation device still acts as an intermediary, but a long-range communication channel is used between the installation device ID and the key manager. For example, in a scenario of setting up a new network in a large building with large distances between the nodes and the key manager, this might be more convenient. Since a long-range (wireless) communication channel is set up between the installation device and the key manager, additional security measures for link security (e.g. TLS) are required to prevent adversaries from sending their fake registration requests over the same channel. In other words, compared to a short-range exchange using RFID—in particular NFC—communication between the installation device and the key manager, a long-range exchange is much less secure. Furthermore, the installation device and the key manager may require a user interface to set up the secure link. The exchange of information is similar to the exchange of information described with reference to FIG. 2: instead of a registration request 202 which involves writing the new node's NID and public key into the key manager's connected RFID tag while the installation device is in relatively close proximity of the key manager, a registration request is transmitted from the installation device to the key manager via a secured long-range communication channel.

Figure 4:
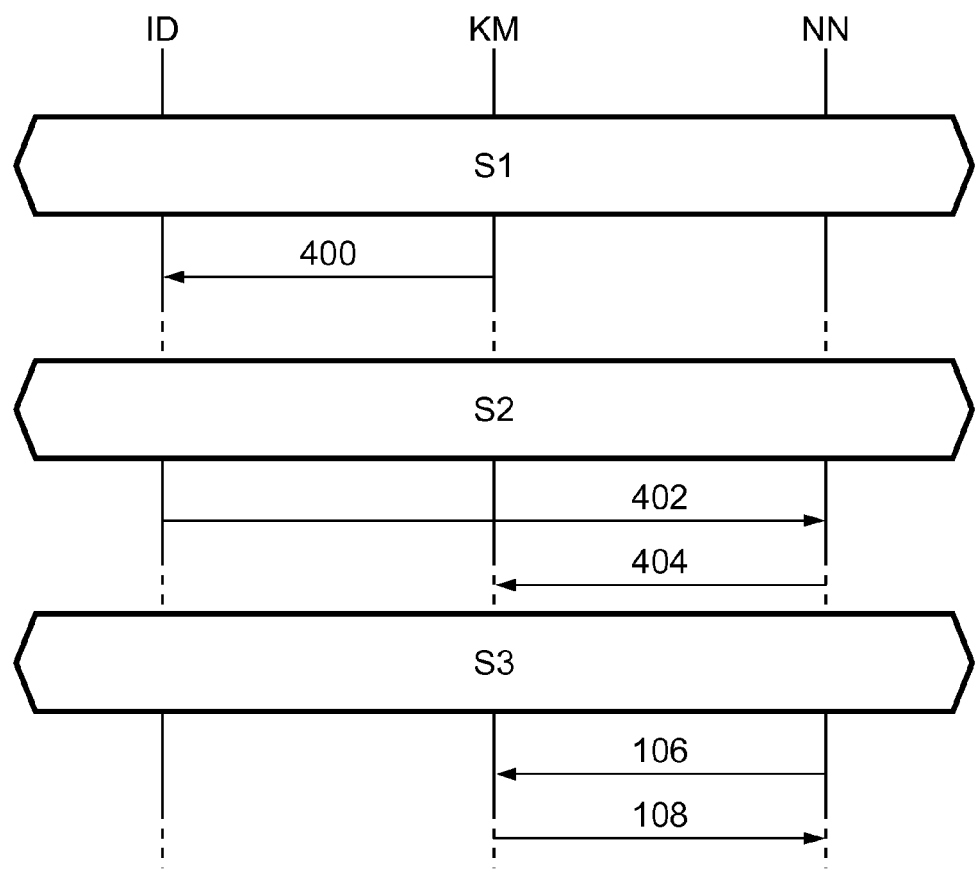
FIG. 4 illustrates a further exemplary embodiment of the invention.

FIG. 4 illustrates a further exemplary embodiment of the invention. In this embodiment, the installation device ID is no longer used as an intermediary for node registration. Instead, the new node NN registers itself directly with the key manager KM. This embodiment works as follows:

The key manager KM generates a bag of unique registration tokens—i.e. a set of large random (i.e. unpredictable) numbers—and this bag is handed over to the installation device ID together with the key manager's public key in the step "setup installation device" S1.

In the step "add new node" S2, the installation device ID writes 402 one of the registration tokens to the new node's connected RFID tag, together with the key manager's public key. Subsequently, the new node NN sends a registration request 404 to the key manager KM via in-band communication (i.e. over the newly established network). The registration request 404 contains the new node's NID and public key, as well as the registration token which it received from the installation device ID. The key manager KM will only grant one registration request for each registration token that it has handed out to the installation device ID.

The step "start secure end-to-end communication" remains unchanged.

This procedure is secure, because a registration token—which is both unpredictable and can only be used once—is required for the registration request 404 to be granted by the key manager KM. Note that the registration request 404 should be encrypted using the key manager's public key, such that an adversary cannot intercept the message, extract the unique registration token and quickly send a falsified registration request using this token.

As an additional security measure, the registration tokens can have a limited lifetime. For example, their validity may expire after one hour, thereby limiting the window of opportunity for an adversary to gain access to one of the tokens (e.g. by reading them out of the connected RFID tag of a newly installed node). It is noted that this risk can also be reduced by other means, for example by protecting the RFID tag's memory.

Step "Start Secure Node-to-Node Communication"

This step is performed when a first node wants to achieve end-to-end security with a second node. The first node requests the public key of the second node—identified by the node's identifier (NID)—from the key manager KM. The key manager KM will respond with the node's public key and its NID and this response will be signed using the key manager's private key, such that the first node can verify the authenticity of the response using its copy of the key manager's public key. The key manager KM does not have to take further security measures—such as checking the identity of the requester and/or encrypting the response—because the information in the response is public.

However, it should be infeasible for an adversary to modify the key manager's public key (which is stored in a node's RFID tag or the node itself), because the key manager KM which is represented by this key is the trust anchor for the key distribution. In order to prevent an adversary from modifying this key, the RFID tag—or a specific part of its memory—may be locked after said key has been written to it, for example. Furthermore, it is noted that the first node may choose between requesting the public key of the second node every time it wants to setup a secure channel with the second node, or storing (caching) the response to prevent network traffic later on, thereby decreasing latency and/or energy consumption.

Finally, it is noted that in the above-described registration steps for new nodes the installation device repeatedly reads node-specific public keys from those nodes. However, as an alternative the installation device could create a new public-private key pair for a specific node and store the private key in the node's RFID tag. The advantage of this alternative is that the node does not have to be able to generate a public-private key pair. It is noted that key generation is a computationally expensive task. Furthermore, the node does not need to have storage space for its own public key. A disadvantage of this alternative is that the private key has to be available outside of the node for some time, which makes it slightly less secure.

After receipt of the public key of the second node, the first node may use this public key to encrypt messages for the second node. Alternatively, the first node may use this public key to enable the establishment of (symmetric) session keys for further communication with the second node. In both cases, end-to-end security is achieved.

The above-mentioned embodiments illustrate rather than limit the invention, and the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. The mere fact that certain measures are recited in mutually different dependent claims does not indicate that a combination of these measures cannot be used to advantage.

LIST OF REFERENCE SIGNS

ID installation device
KM key manager
NN new node
NN2 further new node
S1 step "setup installation device"
S2 step "add new node"
S3 step "start secure end-to-end communication"
100 send public key of key manager
102 send public key of key manager as part of network join information
104 send identifier and public key of new node
106 request for public key of other node
108 send identifier and public key of other node signed by key manager
200 send identifier and public key of new node
202 registration request comprising identifier and public key of new node
300 send public key of key manager as part of network join information
302 send identifier and public key of further new node
304 registration request for all new nodes
400 send public key of key manager and a bag of registration tokens
402 send public key of key manager and a registration token as part of network join information
404 registration request comprising public key and identifier of new node and registration request

The invention claimed is:

1. A method for establishing secure communication between nodes in a network, wherein the network comprises a key manager which accommodates a key-manager-specific public key and a corresponding key-manager-specific private key, the method comprising:
    storing a copy of the key-manager-specific public key in an installation device when the installation device is in close proximity to the key manager and the key manager is physically inaccessible to unauthorized people;
    providing, by the installation device, a new node with the copy of the key-manager-specific public key;
    registering said new node with the key manager by providing a node-specific public key and an identifier of said new node to the key manager; and
    establishing end-to-end secure connections from a first node in the network to said new node by having the key manager respond with the node-specific public key of the new node and the identifier of the new node, signed using the key-manager-specific private key of the key manager, in response to a request, from the first node, for the node-specific public key of said new node from the key manager.

2. The method as claimed in claim 1, further comprising: providing, by the installation device, the copy of the key-manager-specific public key to the new node by writing the copy of the key-manager-specific public key into a Radio-frequency Identification (RFID) tag connected to said new node.

3. The method as claimed in claim 1, further comprising: storing, before the installation device provides the copy of the key-manager-specific public key to the new node, the copy of the key-manager-specific public key in the installation device via a RFID connection between the installation device and a RFID tag connected to the key manager.

4. The method as claimed in claim 1, further comprising: storing, before the installation device provides the copy of the key-manager-specific public key to the new node, the copy of the key-manager-specific public key in the installation device via a secure and authenticated connection between the installation device and the key manager.

5. The method as claimed in claim 1, further comprising: providing, by the installation device, the node-specific public key and the identifier of the new node to the key manager by reading the node-specific public key and the identifier of the new node from a RFID tag connected to said new node and by subsequently writing the node-specific key and the identifier of the new node to a RFID tag connected to the key manager.

6. The method as claimed in claim 5, further comprising: providing, by the installation device, the node-specific public key and the identifier of the new node to the key manager as part of a batch registration request for a plurality of new nodes.

7. The method as claimed in claim 1, further comprising: providing, by the installation device, the node-specific public key and the identifier of the new node to the key manager by reading the node-specific public key and the identifier of the new node from a RFID tag connected to said new node; and
    subsequently writing the node-specific key and the identifier of the new node to the key manager via a secured wireless connection.

8. The method as claimed in claim 1, further comprising:
generating, by the key manager, a registration token for the new node;
providing the registration token to the new node such that the new node may send a registration request comprising the node-specific public key, the identifier of the new node, and the registration token to the key manager via the network; and
granting, by the key manager, the registration request only if it determines that the registration token is valid.

9. The method as claimed in claim 8, further comprising:
providing, by the installation device, the registration token to the new node by writing the registration token to a RFID tag connected to said new node.

10. The method as claimed in claim 8, wherein the registration token has a limited lifetime.

11. The method as claimed in claim 1, wherein the following steps are performed in order to setup an end-to-end secure connection between a first registered node and a second registered node:
the first registered node requests the public key specific to the second registered node from the key manager;
the key manager creates a response comprising at least the public key specific to the second registered node;
the key manager signs the response with the key-manager-specific private key and sends the signed response to the first registered node;
the first registered node verifies the authenticity of the response using the copy of the key-manager-specific public key; and,
if the response is authentic, the first registered node uses the public key specific to the second registered node to setup said end-to-end secure connection.

12. The method of claim 1, wherein one node in the network acts as the key manager.

13. The method of claim 1, wherein the installation device joins the new node into the network.

14. The method of claim 1, wherein the identifier of the new node is a Media Access Control (MAC) address of the new node.

15. The method of claim 1, wherein a RFID tag is physically connected to the key manager.

16. The method of claim 15, wherein the installation device is in close proximity to the RFID tag while reading the copy of the key-manager-specific public key.

17. The method of claim 1, wherein the installation device collects identifiers and public keys of all new nodes.

18. The method of claim 17, wherein all registration requests for the new nodes are simultaneously written into a RFID tag.

19. A key manager implemented as a hardware router which accommodates a key-manager-specific public key and a corresponding key-manager-specific private key, that is configured to store a copy of the key-manager-specific public key in an installation device when an installation device is in close proximity to the key manager and the key manager is physically inaccessible to unauthorized people, provide, by the installation device, a new node with the copy of the key-manager-specific public key, register the new node with the key manager by providing a node-specific public key and an identifier of the new node to the key manager, and establish end-to-end secure connections from a first node in the network to the new node by having the key manager respond with the node-specific public key of the new node and the identifier of the new node, signed using the key-manager-specific private key of the key manager, in response to a request, from the first node, for the node-specific public key of the new node from the key manager.

20. A non-transitory computer-readable medium comprising:
instructions for storing a copy of a key-manager-specific public key in an installation device when the installation device is in close proximity to the key manager and the key manager is physically inaccessible to unauthorized people;
instructions for providing, by the installation device, a new node with the copy of the key-manager-specific public key;
instructions for registering the new node with a key manager by providing a node-specific public key and an identifier of the new node to the key manager; and
instructions for establishing end-to-end secure connections from a first node in the network to the new node by having the key manager respond with the node-specific public key of the new node and the identifier of the new node, signed using a key-manager-specific private key of the key manager, in response to a request, from the first node, for the node-specific public key of said new node from the key manager.

* * * * *